United States Patent [19]

Pape et al.

[11] Patent Number: 4,486,336

[45] Date of Patent: Dec. 4, 1984

[54] SILICONE FOAM-SUPPRESSANT COMPOSITIONS

[75] Inventors: Peter G. Pape, Sanford; David N. Willing, Midland, both of Mich.

[73] Assignee: Dow Corning Corporation, Midland, Mich.

[21] Appl. No.: 498,378

[22] Filed: May 26, 1983

[51] Int. Cl.³ .................. B01D 19/04; C09B 67/00; D06P 1/673
[52] U.S. Cl. .................................... 252/321; 252/358
[58] Field of Search .............................. 252/321, 358

[56] References Cited

U.S. PATENT DOCUMENTS

| 3,383,327 | 5/1968 | Sullivan | 252/358 |
| 3,455,839 | 7/1969 | Rauner | 252/321 |
| 3,691,091 | 9/1972 | Koerner | 252/358 |
| 3,984,200 | 10/1976 | Doesburg | 252/321 |
| 4,082,690 | 4/1978 | Farminer | 252/321 |
| 4,145,308 | 3/1979 | Simoneau et al. | 252/321 |

*Primary Examiner*—John Kight
*Assistant Examiner*—Marvin L. Moore
*Attorney, Agent, or Firm*—George A. Grindahl; Andrew H. Ward

[57] ABSTRACT

Silicone foam suppressant compositions are disclosed consisting essentially of a low viscosity polydimethylsiloxane and a high viscosity polydimethylsiloxane, a certain siloxane resin, and amorphous silica. These foam suppressant compositions can be used to suppress foam in both aqueous and hydrocarbon liquids. Advantageously, these foam suppressant compositions employ less of the resin and less amorphous silica than are normally found in silicone foam suppressants.

14 Claims, No Drawings

SILICONE FOAM-SUPPRESSANT COMPOSITIONS

BACKGROUND OF THE INVENTION

Foaming occurs in many processes in the chemical, food preparation, petroleum, and other industries. Often a foam can overflow the vessel in which a foaming liquid is confined, clogging overflow lines or relief valves, and sometimes exposing operating personnel to hazardous liquids and vapors. Even when confined to the vessel, foams take up volume and thereby subtract from productive capacity.

Foaming is a problem with aqueous processes, such as paper pulping, emulsion polymerization, and the like. Foaming is also a problem with processes involving liquid hydrocarbons, such as petroleum refinery processes, such as delayed coking, asphalt processing and the like; wellhead separation of gas from oil; in hydraulic and lubricating processes in general; and the like.

To avoid foaming, or ameliorate the effects of foaming, foam suppressant compositions are often added to the foaming, or potentially foaming, liquid. A composition added to a liquid before it foams, to prevent excessive foaming, is commonly termed an antifoam. A composition added to an already foaming liquid, to knock down the foam, is commonly termed a defoamer. The term foam suppressant composition is used herein to encompass both these terms, i.e., antifoam and defoamer.

It is known to add small amounts of various silicone compositions to either aqueous liquids or hydrocarbon liquids to suppress foam.

U.S. Pat. No. 3,445,839 discloses an aqueous defoaming composition consisting essentially of a polydimethylsiloxane fluid, a resin composed of $(CH_3)_3SiO_{\frac{1}{2}}$ units and $SiO_2$ units, and a silica aerogel.

U.S. Pat. No. 3,691,091 discloses a silicone emulsion, for defoaming aqueous liquids, in which the silicone consists essentially of a polydimethylsiloxane fluid, silica, and an organosilicon compound or oligomer containing alkoxy and/or silanol groups.

U.S. Pat. No. 4,082,690 discloses a silicone composition, useful for reducing foam in non-aqueous liquids, consisting essentially of a polydimethylsiloxane, a siloxane resin composed of $(CH_3)_3SiO_{\frac{1}{2}}$ units and $SiO_2$ units, and a hydrocarbon solvent.

Other foam suppressant compositions are directed to both aqueous liquids and hydrocarbon liquids. To be useful in both said liquids, it is desirable that a foam suppressant composition be stable upon emulsification, and also stable upon dispersion in a hydrocarbon solvent, in order to facilitate foam suppression.

U.S. Pat. No. 4,145,308 discloses foam suppressant compositions, useful in both aqueous and hydrocarbon liquids, consisting essentially of a polydimethylsiloxane, a silicone resin composed of $R_3SiO_{\frac{1}{2}}$ units and $SiO_2$ units wherein R is a monovalent hydrocarbon radical, and fume silica or precipitated silica.

U.S. Pat. No. 3,383,327 discloses a foam control agent prepared from a polydiorganosiloxane fluid, silica, and an hydroxylated polydimethylsiloxane.

While these approaches of the prior art produce foam suppressant compositions, certain problems remain. Relatively high silica levels, chemical treatment of the silica, and relatively high resin contents tend to increase the cost of manufacture of said compositions. Additionally, high silica levels make dilution of the foam suppressant composition with a hydrocarbon solvent difficult, as the silica has a tendency to precipitate upon such dilution and thus the silica can become ineffective in the suppression of foam.

None of the above patents teaches the use of two trimethylsiloxy-ended polydimethylsiloxane fluids of differing viscosities, in combination with a silica and a siloxane resin. In fact, U.S. Pat. No. 3,691,091 teaches that if a second trimethylsiloxy-ended polydimethylsiloxane fluid is substituted for the hydroxy or alkoxy substituted organosilicon compound or oligomers of the compositions of said patent, the result of said substitution is a composition that is not flowable, and does not defoamm a foaming liquid.

SUMMARY OF THE INVENTION

The present invention relates to foam suppressant compositions consisting essentially of: a high viscosity polydimethylsiloxane; a low viscosity polydimethylsiloxane; a siloxane resin composed of $(CH_3)_3SiO_{\frac{1}{2}}$ units and $SiO_2$ units; and amorphous silica. The present invention further relates to a method for suppressing foam in aqueous liquids and hydrocarbon liquids by addition of the foam suppressant compositions of the present invention to said liquids.

It is an object of the present invention to provide an effective foam suppressant composition. A further object is to provide a relatively inexpensive foam suppressant composition. Still another object is to provide a foam suppressant composition useful in both aqueous and hydrocarbon liquids; and another object is to provide a silica-containing foam suppressant composition that is stable to dilution with aliphatic hydrocarbon solvents.

These objects, and other objects which will be apparent to those skilled in the art upon consideration of the following specification and claims, are realized by the compositions of the present invention, wherein a major amount of a high viscosity, trimethylsiloxy-ended polydimethylsiloxane fluid, a minor amount of a low viscosity trimethylsiloxy-ended polydimethylsiloxane fluid, a minor amount of siloxane resin composed of $(CH_3)_3SiO_{\frac{1}{2}}$ units and $SiO_2$ units, and a minor amount of amorphous silica, provide a foam suppressant composition of greater foam suppressing efficacy than is predictable from consideration of the known foam suppressing efficacy of such high viscosity siloxane fluids in general, and consideration of the known efficacy of the low viscosity siloxane fluid, siloxane resin, and silica in combination. This unpredictably greater efficacy is especially surprising in view of the disclosure of U.S. Pat. No. 3,691,091 discussed hereinabove.

Compositions of the present invention can contain very low concentrations of the siloxane resin and amorphous silica and still provide effective foam suppression. Advantageously, because of low silica concentrations, the compositions of the present invention are stable to dilution with hydrocarbon solvents, i.e., the compositions of the present invention can be diluted with hydrocarbon solvents without precipitating the silica. This property is of major importance in combatting foam in hydrocarbon liquids.

DETAILED DESCRIPTION OF THE INVENTION

The present invention relates to a foam suppressant composition consisting essentially of (A) from about 75% to about 99%, by weight, based on the total weight of the composition, of α,ω-bis-(trimethylsiloxy) polydimethylsiloxane having a viscosity of from about $5.00 \times 10^{-3} m^2$/second to about $2.00 \times 10^{-1} m^2$/second at 25° C., (B) from about 0.75% of about 18.75%, by weight, based on the total weight of the composition, of α,ω-bis-(trimethylsiloxy) polydimethylsiloxane having a viscosity of from about $1.00 \times 10^{-5} m^2$/second to about $1.5 \times 10^{-3} m^2$/second at 25° C., (C) from about 0.02% to about 2.5%, by weight, based on the total weight of the composition, of a siloxane resin composed of $(CH_3)_3SiO_{\frac{1}{2}}$ units and $SiO_2$ units, wherein the ratio of $(CH_3)_3SiO_{\frac{1}{2}}$ units to $SiO_2$ is from about 0.4:1 to about 1.2:1, and (D) from about 0.10% to about 3.75%, by weight, based on the total weight of the composition, of amorphous silica, said silica having a surface area of from about 50 $m^2$/g to about 400 $m^2$/g.

The present invention further relates to the use of said foam suppressant composition in a method for suppressing foam in an aqueous or hydrocarbon liquid, said method comprising adding to said liquid from about 0.5 ppm to about 200 ppm, by weight, based on the weight of said liquid, of a foam suppressant composition consisting essentially of (A) from about 75% to about 99%, by weight, based on the total weight of the composition, of α,ω-bis-(trimethylsiloxy) polydimethylsiloxane having a viscosity of from about $5.00 \times 10^{-3} m^2$/second to about $2.00 \times 10^{-1} m^2$/second at 25° C., (B) from about 0.75% to about 18.75%, by weight, based on the total weight of the composition, of α,ω-bis-(trimethylsiloxy) polydimethylsiloxane having a viscosity of from about $1.00 \times 10^{-5} m^2$/second to about $1.5 \times 10^{-3} m^2$/second at 25° C., (C) from about 0.02% to about 2.5%, by weight, based on the total weight of the composition, of a siloxane resin composed of $(CH_3)_3SiO_{\frac{1}{2}}$ units and $SiO_2$ units, wherein the ratio of $(CH_3)_3SiO_{\frac{1}{2}}$ units to $SiO_2$ units is from about 0.4:1 to about 1.2:1 and (D) from about 0.10% to about 3.75%, by weight, based on the total weight of the composition, of amorphous silica, said silica having a surface area of from about 50 $m^2$/g to about 400 $m^2$/g.

The α,ω-bis-(trimethylsiloxy) polydimethylsiloxane fluids used in preparing the compositions of the present invention are quite well-known and widely available. Methods of synthesis of said fluids are also well-known and need not be elaborated upon herein.

Component (A) of the compositions of the present invention is a high viscosity α,ω-bis-(trimethylsiloxy) polydimethylsiloxane fluid having a viscosity of from about $5.00 \times 10^{-3} m^2$/second to about $2.00 \times 10^{-1} m^2$/second at 25° C.; more preferably said fluid has a viscosity of from about $6.00 \times 10^{-2} m^2$/second to about $1.00 \times 10^{-1} m^2$/second at 25° C. Component (A) is present in the compositions of the present invention from about 75% to about 99%, by weight, based on the total weight of the composition. More preferably, Component (A) is present from about 80% to about 98%, by weight, based on the total weight of the composition. Most preferably, Component (A) is present from about 85% to about 95%, by weight, based on the total weight of the composition.

Component (B) of the compositions of the present invention is a low viscosity of α,ω-bis-(trimethylsiloxy) polydimethylsiloxane fluid having a viscosity of from about $1.00 \times 10^{-5} m^2$/second to about $1.50 \times 10^{-3} m^2$/second at 25° C. Preferably said fluid has a viscosity of about $1.00 \times 10^{-3} m^2$/second at 25° C. Component (B) is present from about 0.75% to about 18.75%, by weight, based on the total weight of the composition. More preferably, Component (B) is present from about 1.5% to about 15%, by weight, based on the total weight of the composition. Most preferably, Component (B) is present from about 3.8% to about 11.3%, by weight, based on the total weight of the composition.

The viscosity of an α,ω-bis-(trimethylsiloxy) polydimethylsiloxane fluid used as Component (A) or Component (B) of the compositions of the present invention can be measured by a variety of well-known methods. Viscosities are referred to herein were measured by capillary viscometry.

Component (C) of the compositions of the present invention is a siloxane resin composed of $(CH_3)_3SiO_{\frac{1}{2}}$ units and $SiO_2$ units. Such resins are well-known and commercially available; the synthesis of such resins is well documented in the organosilicon chemistry literature, and need not be detailed herein.

The ratio of $(CH_3)_3SiO_{\frac{1}{2}}$ units to $SiO_2$ units in the siloxane resin, Component (C) of the compositions of the present invention, can be from about 0.4:1 to about 1.2:1. Preferably, the ratio of $(CH_3)_3SiO_{\frac{1}{2}}$ units to $SiO_2$ units is from about 0.6:1 to about 1:1.

Component (C) is present from about 0.02% to about 2.5%, by weight, based on the total weight of the composition. More preferably, Component (C) is present from about 0.2% to about 2%, by weight, based on the total weight of the composition. Most preferably, Component (C) is present from about 0.5% to about 1.5%, by weight, based on the total weight of the composition.

Component (D) is an amorphous silica having a surface area from about 50 $m^2$/g to about 400 $m^2$/g. More preferably Component (D) has a surface area of from about 100 $m^2$/g to about 300 $m^2$/g.

Amorphous silica is commercially available from numerous sources. Surface area is normally measured and reported by the manufacturer of said silica. Such methods as titration methods, or the B.E.T. differential adsorption method are used to measure the surface area of amorphous silica.

Amorphous silica is available in three main types, classified according to the method of manufacture. These three types are silica gel, fume silica, and precipitated silica.

Silica gel is manufactured by acidifying an aqueous solution of sodium silicate, which causes the formation of an $SiO_2$ gel. This $SiO_2$ gel is mechanically broken up, then washed free of salt and acid, and then dried.

Fume silica is obtained by condensing vapors of $SiO_2$. $SiO_2$ vapors can be produced by heating crystalline $SiO_2$, such as high purity quartz, passing crystalline $SiO_2$ into a high temperature plasma arc, or, most commonly, the $SiO_2$ vapors can be produced by reacting $SiCl_4$ and $H_2$ with $O_2$.

Precipitated silica can be produced by chemically destabilizing an aqueous solution of sodium silicate. A fine precipitate is formed upon chemical destabilization, and said precipitate is subsequently washed and dried.

While it is believed that any amorphous silica having the required surface area can be used in the compositions of the present invention, the use of precipitated silica is preferred.

Amorphous silica, Component (D) in the compositions of the present invention, is present from about 0.10% to about 3.75%, by weight, based on the total weight of the composition. More preferably, Component (D) is present from about 0.3% to about 3%, by weight, based on the total weight of the composition. Most preferably, Component (D) is present from about 1.25% to about 2.25%, by weight, based on the total weight of the composition.

The amorphous silica used as Component (D) in the compositions of the present invention can be chemically modified or treated, such as treated with organoalkoxysilanes or organohalosilanes in the well-known manner, if desired.

Optional, non-essential ingredients can be included in the compositions of the present invention, provided they do not adversely affect the foam suppressing activity of the compositions of the present invention. Examples of such ingredients include, but are not limited to, dyes, antibacterial preparations, and the like. The amounts of such optional, non-essential ingredients are not taken into account as part of the total weight of the composition, either in ascertaining the respective percentages of Components (A), (B), (C), and (D), or in determining the amount of foam suppressant composition of the present composition to be added to a liquid.

Compositions of the present invention can be prepared by two types of general procedures, one of which is preferred. In the first, preferred, general procedure, Components (B), (C), and (D) are thoroughly mixed, and heated to provide a concentrate. The appropriate amount of Component (A) is then added to said concentrate with simple mixing, thus producing the compositions of the present invention. In a second type of general procedure, Components (A), (B), (C), and (D) are all thoroughly mixed, and heated, thus providing compositions of the present invention.

Thorough mixing, as referred to herein, can be accomplished by high shear mechanical mixers, such as high intensity mixers, colloid mills, and the like.

Heating can be accomplished by heating either the mixture of Components (A), (B), (C), and (D), or the mixing of Components (B), (C), and (D) together at a temperature of from about 100° C. to about 250° C., and maintaining said temperature for a period of time from about 5 minutes to about 3 hours.

While the heating and mixing steps can be performed sequentially, i.e., heating, then mixing, or mixing, then heating, or simultaneously, it is preferred that the components be first thoroughly mixed, and then heated.

Exemplary of methods that can be used to prepare the compositions of the present invention are the following:

In a first, and preferred exemplary method, Components (B), (C), and (D) are first mixed together in a colloid mill, then heated to a temperature of 200° C., and said temperature is maintained for about 2 hours. The resulting concentrate of Components (B), (C), and (D) is cooled to room temperature, and the appropriate amount of Component (A) is added to said concentrate. This four component mixture is stirred with a paddle stirrer for 5 minutes.

In a second exemplary method, Components (A), (B), (C), and (D) are first thoroughly mixed in a high intensity mixer, then transferred to a vessel, where said components are heated to a temperature of 150° C., and said temperature is maintained for 1 hour, resulting in a foam suppressant composition of the present invention.

The above exemplary methods are set forth for purposes of illustration. Those skilled in the art will recognize a variety of other methods suitable to thoroughly mix and heat the components to form a composition of the present invention.

In order to properly function as foam suppressants, the compositions of the present invention must be thoroughly dispersed in the liquid in which foam is to be suppressed. This dispersal can be accomplished in three main ways:

First, if the degree of agitation in the liquid in which foam is to be suppressed is sufficiently high, the compositions of the present invention can be dispersed by per se addition to said liquid.

Second, if the liquid in which foam is to be suppressed is a hydrocarbon liquid, the compositions of the present invention can be effectively dispersed by addition as a dispersion in an aliphatic hydrocarbon solvent.

Third, if the liquid in which foam is to be suppressed is an aqueous liquid, the compositions of the present invention can be effectively dispersed by addition as an emulsion in water.

Hydrocarbon solvents useful in forming dispersions of the compositions of the present invention include straight chained and branched aliphatic hydrocarbons that are liquid at 25° C. and normal atmospheric pressure. Said aliphatic hydrocarbons have the general formula $C_nH_{2n+2}$, wherein n is an integer having a value of from 5 to about 18.

Examples of straight chained aliphatic hydrocarbon solvents include pentane, hexane, heptane, octane, nonane, decane, undecane and the like. Examples of branched aliphatic hydrocarbons include the above straight chained aliphatic hydrocarbons substituted with one or more substituents, such as methyl, ethyl, propyl, butyl, pentyl, hexyl, heptyl and the like; said substituents can themselves be substituted with one or more substituents such as methyl, ethyl, propyl, butyl, pentyl and the like. Illustrative of typical branched aliphatic hydrocarbon solvents are 2,2,4-trimethylpentane; 3-methyl-3-ethylheptane; 3,3-diethylhexane; 3-ethyl-3-propylheptane; and the like.

Most commonly, complex mixtures of aliphatic hydrocarbon solvents are used. Said complex mixtures are readily available. Examples of commercial complex mixtures of aliphatic hydrocarbon solvents include naptha, neutral mineral spirits, white spirits, kerosene, and the like.

Preferably, the aliphatic hydrocarbon solvent is relatively free of aromatic hydrocarbons and unsaturated hydrocarbons, but it is thought that small amounts, such as 15% or 20% by weight or aromatic hydrocarbons such as toluene, xylene, mesitylene, or small amounts, such as 15% or 20% of unsaturated hydrocarbons such as octene or decene, will not significantly diminish the foam suppression efficacy of the compositions of the present invention.

Dispersions of the foam suppressant compositions of the present invention in the aliphatic hydrocarbon solvent are made by simply adding the appropriate amount of foam suppressant composition to the appropriate amount of aliphatic hydrocarbon solvent. Dispersal can be facilitated by simple agitation.

The concentration of foam suppressant composition in aliphatic hydrocarbon is not critical, and can range from 1% by weight or less to 90% by weight, based on the weight of the total mixture, or more. Most practically, said concentration is from about 5% by weight to about 60% by weight of the dispersion.

Emulsions of the foam suppressant compositions of the present invention can be prepared by thoroughly mixing the appropriate amount of foam suppressant composition with the appropriate amount of water and thoroughly mixing the foam suppressant composition and water together using high energy dispersion means, such as a high intensity mixer, colloid mill or the like.

To obtain emulsions of the compositions of the present invention having reasonable stability, e.g., 6 months or more, it is preferred to incorporate effective amounts of one or more surfactants in the water prior to mixing the foam suppressant compositions of the present invention into said water.

The identity of the surfactant is not critical. The surfactant can be anionic, cationic, or nonionic.

Examples of suitable anionic surfactants include sulfonation products of saturated acids and their glycerides, sulfonation products of amides, phosphoric esters of the above-named groups, alkaryl sulfonates and the like.

Examples of suitable cationic surfactants include aliphatic amines, aromatic amines with aliphatic substituents, quaternary ammonium compounds, polyethylenediamine, polypropanolpolyethanolamines and the like.

Examples of suitable nonionic surfactants include condensation products of fatty substances with ethylene oxide, condensation products of phenolic compounds having aliphatic side chains with ethylene oxide and the like.

Typically, from 1.0% to 6.0% of surfactant will constitute an effective amount.

Other components well-known in the emulsion art can be incorporated into the foam suppressant composition emulsion. Examples of other components include thickeners, such as hydroxymethylcellulose, hydroxyethylcellulose and the like, colorants, such as organic dyes, antimicrobial agents, such as 6-acetoxy,2,4-dimethyl-m-dioxane, and the like.

The concentration of the foam suppressant composition in the emulsion is not critical. The concentration can be from about 1% by weight to about 60% by weight. More preferably the concentration is from about 2% by weight to about 30% by weight.

Addition of the foam suppressant compositions of the present invention to a liquid in which it is desired to suppress foam can be accomplished by various means. The foam suppressant composition per se, as an emulsion as hereinabove described, or as a dispersion as hereinabove described, can be added to a liquid by such means as manual addition, metering pump, syringe, eyedropper, and the like. The particular means used is not critical.

The foam suppressant composition of the present invention is added in an amount such that foam will be suppressed. The amount necessary can vary from 0.5 ppm, by which it is meant herein parts by weight of foam suppression composition, exclusive of water, solvent, or non-essential ingredients, per million parts by weight of the liquid in which foam is to be suppressed, to about 200 ppm of composition. The specific amount added is determined by the stability of the foam to be suppressed. Typically, an amount of foam suppression composition from about 25 ppm to about 100 ppm is sufficient to all but the most intractable of foams.

The amount of foam suppression composition added is expressed herein as ppm of active composition. Thus, if the foam suppression composition is furnished as a 10% by weight dispersion, and it is desired to add 25 ppm of foam suppression composition, it will be recognized that 250 ppm of the dispersion will be required.

The compositions of the present invention are conveniently analyzed by gel permeation chromatography (GPC), to determine the molecular weights and relative concentrations of Components (A) and (B).

The composition to be analyzed is first treated with dilute, aqueous $NH_4OH$ to release any of Components (A) or (B) which might be adsorbed onto the surface of the amorphous silica. The amorphous silica can then be filtered off.

A solution of Component (A) plus (B) in a standard GPC solvent can then be prepared in the well-known manner. GPC columns should be selected and calibrated for the analysis of $\alpha,\omega$-bis-(trimethylsiloxy) polydimethylsiloxane. Properly selected and calibrated columns will make possible determination of the relative amounts of said siloxane as a function of molecular weight. Viscosity can then be determined from molecular weight by consulting tables or graphs correlating these two properties. For example, suitable tables are found in the next *Chemistry and Technology of Silicones,* W. Noll, 1968, N.Y. In the case of analyzing a composition of the present invention containing small amounts of Component (B) relative to Component (A), it may be necessary to prepare a solution for GPC of a higher concentration than is normally prepared for use in said techniques such as 5% or 10% by weight.

The foam suppression compositions of the present invention have four main advantages over compositions of the prior art.

First, the present compositions can be manufactured with less resin and less silica and hence are more economical. Second, the present compositions are useful both in aqueous and hydrocarbon liquids. Third, the preferred procedure of preparation, via a concentrate of Components (B), (C), and (D) to which Component (A) is later added, fosters further economics in manufacture as well as economics in distribution. Fourth, the present compositions can be diluted with aliphatic hydrocarbon solvents without causing precipitation of silica Component (D).

Testing Procedures

The efficacy of foam suppression compositions was evaluated herein by the Shaker Test and/or the Pump Test.

The Shaker Test, Dow Corning Corporate Test Method 0844A, gives a relative measure of foam suppressant performance. Fifty ppm (parts of active foam suppressant composition by weight per million parts by weight of liquid in which foam is to be suppressed) of foam suppressant composition were added to a 1%, weight/volume, standard foaming solution of polyethyleneglycol alkyl aryl ether in water. A clean glass bottle was half-filled with said solution plus said composition. The half-filled bottle was capped, then secured to a mechanical shaker, at a distance from the center of rotation of said shaker of 13.3 cm, and said bottle was shaken through an arc of 0.28 radians (16°) at a rate of 350 strokes/minute. The shaking action was stopped at intervals of 10, 40, 60, and 120 seconds from the time shaking was begun, and the times required for foam to, first collapse, then break, were recorded in seconds.

Collapse is defined, in the Shaker Test, as the foam height falling to below 0.5 cm over the majority of the surface. Break is defined as a clear liquid surface showing through the collapsed foam. The size of the break is not critical, since, once breaking starts, the clear area expands rapidly.

The times to collapse and break were recorded herein in seconds. Any time greater than 60 seconds was judged a failure, and was recorded as "F".

The Pump Test, Dow Corning Corporate Test Method 0700, was performed with a special apparatus, wherein the standard foaming solution was pumped rapidly from an outlet at the bottom of a 2 l stainless steel beaker, to the top of said beaker through narrow tubing, said liquid being expelled from said tubing into said beaker with considerable velocity. A high degree of agitation was produced thereby.

The beaker was half-filled with 1 l of a 1% weight/volume standard foaming solution of polyethyleneglycol alkyl aryl ether in water, and 200 ppm of the foam suppressant composition being tested were added to said solution. The mixture in the beaker was then circulated by the pump at a rate of 5 l/minute. The times required to build a foam head of 1 inch (2.54 cm), 2 inches (5.08 cm), and 3 inches (7.62 cm) were measured in seconds and recorded. The values obtained for 1 inch and 2 inch foam heads are a measure of the dispersability of a foam suppressant composition. The value for a 3 inch foam head is related to the lasting power, or durability of a foam suppressant composition.

In the Shaker Test, lower values indicate greater efficacy for the foam suppressant composition being tested. In the Pump Test, higher values indicate greater efficacy.

In order that those skilled in the art may better understand the manufacture and use of the foam suppressant compositions of the present invention, the following examples are included. These examples are not to be construed as limiting the present invention, the scope of which is properly set forth in the appended claims.

All parts and percentages herein are on a weight basis unless otherwise indicated. Values of viscosity reported herein were measured by capillary viscometry, in centistokes, and converted to m²/second by multiplying the viscosity value in centistokes by $1.00 \times 10^{-6}$ m²/second/centistoke, and rounding the result of said multiplication to three significant figures. The abbreviation "s" is used herein to indicate seconds.

EXAMPLE 1

Two hundred g of $\alpha,\omega$-bis-(trimethylsiloxy) polydimethylsiloxane having a viscosity of $1.00 \times 10^{-2}$ m²/s, 3 g of $\alpha,\omega$-bis-(trimethylsiloxy) polydimethylsiloxane having a viscosity of $1.00 \times 10^{-3}$ m²/s, and 0.4 g of a siloxane resin composed of $(CH_3)_3SiO_{\frac{1}{2}}$ units and $SiO_2$ units, wherein the ratio of $(CH_3)_3SiO_{\frac{1}{2}}$ units to $SiO_2$ units was in the range of from 0.6:1 to 1:1, were all added to a 500 ml flask fitted with a paddle agitator.

The above three components were agitated together for 30 minutes. Six-tenths of a gram of Quso®G-30, a precipitated silica having a surface area of approximately 300 m²/g, sold by the Philadelphia Quartz Co., Valley Forge, PA, was then added to the above mixture, and this four component mixture was agitated an additional 30 min.

The contents were removed from the flask, and milled in a colloid mill set at 0.050 inches (0.2 mm), then returned to the flask. The flask and its contents were finally held at 190° C. for 2 hours, with a nitrogen purge, and with continuous agitation.

The resulting foam suppressant composition was evaluated by the Shaker Test, and was found to be an effective foam suppressant. Test results were as follows:

At 10 seconds, the collapse time was found to be 21 s, and the break time 23 s. At 40 seconds the collapse time was 23 s and the break time 27 s. At 60 seconds the collapse time was found to be 27 s and the break time was found to be 29 s. At 120 seconds, the collapse time was 27 s, and the break time 30 s.

EXAMPLE 2

A concentrate for preparing compositions of the present invention was prepared as follows: 77.6 parts of an $\alpha,\omega$-bis-(trimethylsiloxy) polydimethylsiloxane having a viscosity of $1.00 \times 10^{-3}$ m²/s, 8.4 parts of the siloxane resin described in Example 1, and 14 parts of the precipitated silica of Example 1 were loaded into a reaction kettle, and agitated at room temperature for 2 hours. The contents of the kettle were then removed, and passed through a colloid mill with a gap setting of 0.2 mm (0.050 inches). The milled mixture was then heated to a temperature of 200° C., and held at that temperature for about 15 minutes, after which time said mixture was allowed to come to room temperature.

The mixture thus provided was a concentrate for preparing compositions of the present invention. Said concentrate was a greyish white, flowable liquid, free of sediment.

A flowable composition of the present invention was prepared by mixing 1 part of the above concentrate with 3 parts of $\alpha,\omega$-bis-(trimethylsiloxy) polydimethylsiloxane having a viscosity of $1.00 \times 10^{-2}$ m²/s, followed by sample mixing. This composition was evaluated as a foam suppressant, and the results of said evaluation are set forth in Table 4.

EXAMPLES 3-13

Following the procedure of Example 2, varying the ratio of concentrate to high viscosity fluid Component (A), and simultaneously varying the viscosity of Component (A), the foam suppressant compositions set forth in Table 1 were produced.

These compositions were all flowable.

They were evaluated as foam suppressants.

The results of these evaluations are displayed in Tables 2, 3, and 4.

TABLE 1

| Example | % Precipitated Silica Component (D) | % Siloxane Resin Component (C) | % Component (B) | % Component (A) | Viscosity Fluid Component (A) (M²/s) |
|---|---|---|---|---|---|
| 3 | 2.12 | 1.43 | 10.7 | 85.75 | $5.00 \times 10^{-3}$ |
| 4 | 2.12 | 1.43 | 10.7 | 85.75 | $1.00 \times 10^{-2}$ |
| 5 | 1.5 | 1.0 | 7.5 | 90.0 | $1.00 \times 10^{-2}$ |
| 6 | 1.5 | 1.0 | 7.5 | 90.0 | $3.00 \times 10^{-2}$ |

TABLE 1-continued

| Example | % Precipitated Silica Component (D) | % Siloxane Resin Component (C) | % Component (B) | % Component (A) | Viscosity Fluid Component (A) ($M^2/s$) |
|---|---|---|---|---|---|
| 7  | 1.5  | 1.0  | 7.5  | 90.0 | $6.00 \times 10^{-2}$ |
| 8  | 1.15 | 0.77 | 5.75 | 92.3 | $1.00 \times 10^{-2}$ |
| 9  | 0.94 | 0.61 | 4.65 | 93.8 | $1.00 \times 10^{-2}$ |
| 10 | 0.72 | 0.48 | 3.57 | 95.2 | $1.00 \times 10^{-2}$ |
| 11 | 0.58 | 0.38 | 2.88 | 96.2 | $1.00 \times 10^{-2}$ |
| 12 | 0.29 | 0.19 | 1.46 | 98.0 | $1.00 \times 10^{-2}$ |
| 13 | 0.15 | 0.10 | 0.75 | 99.0 | $1.00 \times 10^{-2}$ |

TABLE 2

Viscosity of Component (A) vs. Performance*

| Example | Viscosity of Component (A) $m^2s$ | Shaker Test Collapse Time(s) Break Time(s) after | | | | Pump Test | | |
|---|---|---|---|---|---|---|---|---|
| | | 10s | 40s | 60s | 120s | 1 in. | 2 in. | 3 in. |
| 3 | $5.00 \times 10^{-3}$ | 7/9 | 18/22 | 20/26 | 23/31 | 4s | 35s | 133s |
| 4 | $1.00 \times 10^{-2}$ | 4/5 | 7/10 | 11/17 | 15/25 | 4s | 42s | 217s |
| Comparison[1] | | 3/4 | 8/17 | 14/26 | 18/38 | 13s | 58s | 213s |
| Comparison[2] | $1.00 \times 10^{-2}$ | F/F | F/F | F/F | F/F | | | |

[1]This comparison is the concentrate from Example 2 with no high viscosity fluid Component (A).
[2]This comparison is high viscosity fluid Component (A) tested per se.
*85.75% component (A).

TABLE 3

Viscosity of Component (A) vs. Performance*

| Example | Viscosity of Component (A) $m^2s$ | Shaker Test Collapse Time(s) Break Time(s) | | | | Pump Test | | |
|---|---|---|---|---|---|---|---|---|
| | | 10s | 40s | 60s | 120s | 1 in. | 2 in. | 3 in. |
| 5 | $1.00 \times 10^{-2}$ | 4/5 | 7/10 | 10/15 | 15/23 | 4s | 42s | 152s |
| 6 | $3.00 \times 10^{-2}$ | 5/6 | 10/13 | 11/16 | 13/19 | | | |
| 7 | $6.00 \times 10^{-2}$ | 5/6 | 8/13 | 10/15 | 13/20 | | | |
| Comparison[1] | $1.00 \times 10^{-3}$ | 8/9 | 20/25 | 22/42 | 22/42 | 4s | 13s | 160s |
| Comparison[2] | $3.5 \times 10^{-4}$ | 11/14 | 20/50 | 25/F | 27/F | 4s | 23s | 240s |

[1]A composition wherein fluid Component (A) is the same viscosity as fluid Component (B).
[2]A composition wherein fluid Component (A) has a lower viscosity than Component (B).
*90.0% fluid Component (A).

TABLE 4

% Component (A) vs. Performance*

| Example | % Component (A) | Shaker Test Break Time(s)/Collapse Time(s) | | | |
|---|---|---|---|---|---|
| | | 10s | 40s | 60s | 120s |
| 2  | 75.0   | 3/4   | 4/7   | 8/13  | 13/23 |
| 4  | 85.75  | 4/5   | 7/10  | 11/17 | 15/25 |
| 7  | 89.4   | 4/5   | 8/11  | 11/15 | 17/23 |
| 5  | 90.0   | 4/5   | 10/13 | 11/16 | 13/19 |
| 8  | 92.3   | 7/9   | 15/19 | 17/23 | 20/29 |
| 9  | 93.8   | 9/10  | 17/21 | 19/23 | 22/28 |
| 10 | 95.2   | 7/8   | 14/17 | 14/19 | 15/21 |
| 11 | 96.3   | 7/9   | 15/19 | 17/23 | 17/24 |
| 12 | 98.1   | 12/15 | 20/23 | 21/26 | 21/26 |
| 13 | 99.0   | 18/21 | 22/31 | 25/29 | 26/32 |
| Comparison[1] | 100.0 | F/F | F/F | F/F | F/F |

[1]This comparison is fluid Component (A) per se.
*Component (A) at a viscosity of $1.00 \times 10^{-2} m^2/s$.

EXAMPLE 14

The foam suppressant composition of Example 2 was emulsified as follows: 105 g of distilled water were added to a 500 ml flask equipped with stirrer, and heating was applied to the flask and its contents. Six grams of hydroxyethylcellulose were then added, with agitation, at a temperature of 35° C. When the hydroxyethylcellulose had dissolved, 3 g of glyceryl monostearate and 3 g of polyethyleneglycol monostearate were added to the flask and mixed in with continued agitation. This mixture was heated to a temperature between 60° C. and 70° C., and was held at that temperature for 15 minutes. Thirty grams of the foam suppressant composition of Example 2 were added with continuous agitation and heating. The temperature was held between 60° C. and 70° C. for an additional 15 minutes. After the additional 15 minutes of heating, 150 g of additional distilled water and 0.24 g of an antimicrobial agent, 6-acetoxy-2,4-dimethyl-m-dioxane were added and the flask and its contents were cooled to between 30° C. and 35° C. The cooled emulsion was removed from the flask and milled in a colloid mill set at 0.4 mm, (0.010 in). This emulsion was evaluated as a foam suppressant composition. The results of this evaluation are displayed in Table 5.

EXAMPLE 15

A foam suppressant composition was prepared by the procedure outlined in Example 2 with the following components and final concentrations:
Fluid Component (A): 75%
Viscosity of Component (A): $5.00 \times 10^{-3} m^2/s$
Fluid Component (B): 18.75%
Viscosity of Component (B): $1.00 \times 10^{-3} m^2/s$
Resin Component (C): 2.5%
Silica Component (D): 3.75%

The resulting foam suppressant composition was emulsified by the procedure of Example 14. Evaluation results for the foam suppressant composition above are displayed in Table 5.

EXAMPLE 16

A 10% emulsion of the foam suppressant composition of Example 4 was prepared by the procedure of Example 14 and said emulsion was evaluated. See Table 5.

EXAMPLE 17

A 10% emulsion of the foam suppressant composition of Example 1 was prepared by the procedure of Example 14 and said emulsion was evaluated. See Table 5.

EXAMPLE 18

A 10% emulsion of the foam suppressant composition of Example 3 was prepared by the procedure of Example 14 and said emulsion was evaluated. See Table 5.

EXAMPLE 19

Example 18 was repeated, except that Component (A) and the concentrate of Example 2 were emulsified separately and then combined by simple mixing. See Table 5.

EXAMPLE 20

The foam suppressant composition of Example 8 was emulsified as set forth in Example 19, i.e., Component (A) was emulsified separately and later combined with an emulsion of Components (B), (C), and (D). See Table 5.

EXAMPLE 21

A foam suppressant composition was prepared by mixing 10 parts of the concentrate of Example 2 with 90 parts of $\alpha,\omega$-bis-(trimethylsiloxy) polydimethylsiloxane having a viscosity of $6.00 \times 10^{-2} m^2/s$. The resulting foam suppressant composition was diluted to 40% with refined kerosene. Little or no silica separation was evident even after centrifugation for 1 hour at 3000 rpm. By contrast, when the concentrate of Example 2, which is not an embodiment of the present invention, was dispersed in refined kerosene, severe separation of the silica was apparent even without centrifugation.

EXAMPLE 22

The procedure of Example 21 was followed, except that fluid Component (A) had a viscosity of $1.00 \times 10^{-1} m^2/s$. Little or no settling of silica was noted. See Table 6.

EXAMPLE 23

The foam suppressant composition dispersion of Example 21 was further diluted with refined kerosene such that the concentration of foam suppressant composition was 5%. Little or no settling of silica was noted. This dispersion was tested at various additive levels in highly agitated North Slope crude oil. The following results were obtained:

| Concentration of Foam Suppressant Composition in Crude Oil | Volume % Foam | Volume % Oil |
| --- | --- | --- |
| 0 | 89 | 11 |
| 1 ppm | 86 | 14 |
| 5 ppm | 85 | 15 |
| 10 ppm | 85 | 15 |

Thus it can be seen that the liquid fraction of the foaming crude oil is increased 36%. See Table 6 for further evaluation results.

TABLE 5

Foam Suppressant Compositions Applied As 10% Emulsions

| Example | Viscosity of Component (A) $m^2/s$ | Percentage of Component (A) | Shaker Test Collapse Time(s)/ Break Time(s) | | | |
| --- | --- | --- | --- | --- | --- | --- |
| | | | 10s | 40s | 60s | 120s |
| 14 | $1.00 \times 10^{-2}$ | 75.0 | 21/23 | 23/27 | 27/29 | 27/30 |
| 15 | $5.00 \times 10^{-3}$ | 75.0 | 5/7 | 6/9 | 7/10 | 11/19 |
| 16 | $1.00 \times 10^{-2}$ | 85.75 | 13/15 | 12/15 | 11/15 | 15/20 |
| 17 | $1.00 \times 10^{-2}$ | 85.75 | 9/35 | 8/13 | 9/11 | 10/15 |
| 18 | $1.00 \times 10^{-2}$ | 89.4 | 12/13 | 16/19 | 10/15 | 9/15 |
| 19 | $1.00 \times 10^{-2}$ | 90.0 | 12/13 | 9/11 | 10/13 | 12/17 |
| 20 | $1.00 \times 10^{-2}$ | 90.0 | 10/12 | 7/10 | 5/11 | 8/16 |
| 21 | $1.00 \times 10^{-2}$ | 92.3 | 15/19 | 22/28 | 17/25 | 14/26 |

TABLE 6

Foam Suppressant Compositions Applied As Dispersions In Kerosene

| Example | Concentration (%) | Viscosity of Component A $m^2/s$ | Shaker Test Collapse Time(s)/ Break Time(s) | | | |
| --- | --- | --- | --- | --- | --- | --- |
| | | | 10s | 40s | 60s | 120s |
| 22 | 40 | $1.00 \times 10^{-1}$ | 7/9 | 10/13 | 9/12 | 11/16 |
| 23 | 40 | $6.00 \times 10^{-2}$ | 6/8 | 9/12 | 8/11 | 8/14 |
| Comparison[1] | 0 | | F/F | F/F | F/F | F/F |
| Comparison[2] | 36 | $6.00 \times 10^{-2}$ | F/F | F/F | F/F | F/F |
| Comparison[3] | 3.6 | | F/F | F/F | F/F | F/F |

[1] Kerosene
[2] Kerosene plus $6.00 \times 10^{-2} m^2/s$ fluid Component (A).
[3] Concentrate of Example 2 dispersed in kerosene.
Note:
Each of the above Examples and Comparisons were tested at 50 parts per million active foam suppressant composition, as specified in the Shaker Test.

EXAMPLE 24

A concentrate for preparing compositions of the present invention was prepared as follows: 87.75 parts of an $\alpha,\omega$-bis-(trimethylsiloxy) polydimethylsiloxane, 2.25 parts of the siloxane resin described in Example 1, and 10.0 parts of the precipitated silica described in Example 1 were processes as described in the concentrate preparation of Example 2.

The resulting concentrate was a flowable liquid, free of sediment.

Said concentrate was then mixed with a α,ω-bis-(trimethylsiloxy) polydimethylsiloxane having a viscosity of $1.00 \times 10^2 m^2/s$, thus forming a foam suppressant of the present invention having the following amounts of components (A), (B), (C) and (D):

Fluid Component (A): 98%
Fluid Component (B): 1.75%
Resin Component (C): 0.05%
Silica Component (D): 0.20%

This composition was evaluated by the Shaker Test hereinabove described. At 10 seconds, the collapse time was found to be 20 s, and the break time was found to be 20 s. At 40 seconds the collapse time was found to be 27 s and the break time was found to be 32 s. At 60 seconds, the collapse time was found to be 28 s and the break time was found to be 33 s. At 120 seconds, the collapse time was found to be 27 s and the break time was found to be 32 s.

That which is claimed is:

1. A foam suppressant composition consisting essentially of
   (A) from about 75% to about 99%, by weight, based on the total weight of the composition, of α,ω-bis-(trimethylsiloxy) polydimethylsiloxane having a viscosity of from about $5.00 \times 10^{-3} m^2$/second to about $2.00 \times 10^{-1} m^2$/second at 25° C.,
   (B) from about 0.75% to about 18.75%, by weight, based on the total weight of the composition, of α,ω-bis-(trimethylsiloxy) polydimethylsiloxane having a viscosity of from about $1.00 \times 10^{-5} m^2$/second to about $1.50 \times 10^{-3} m^2$/second at 25° C.,
   (C) from about 0.02% to about 2.5%, by weight, based on the total weight of the composition, of a siloxane resin composed of $(CH_3)_3SiO_{\frac{1}{2}}$ units and $SiO_2$ units, wherein the ratio of $(CH_3)_3SiO_{\frac{1}{2}}$ units to $SiO_2$ units is from about 0.4:1 to about 1.2:1, and
   (D) from about 0.10% to about 3.75%, by weight, based on the total weight of the composition, of amorphous silica, said silica having a surface area of from about 50 $m^2/g$ to about 400 $m^2/g$.

2. A foam suppressant composition as recited in claim 1 wherein Component (A) is from about 80% to about 98%, by weight, based on the total weight of the composition, Component (B) is from about 1.5% to about 15%, by weight, based on the total weight of the composition, Component (C) is from about 0.2% to about 2%, by weight, based on the total weight of the composition, and Component (D) is from about 0.3% to about 3%, by weight, based on the total weight of the composition.

3. A foam suppressant composition as recited in claim 2 wherein Component (A) has a viscosity of from about $6.00 \times 10^{-2} m^2$/second to about $1.00 \times 10^{-3} m^2$/second at 25° C., Component (B) has a viscosity of about $1.00 \times 10^{-3} m^2$/second at 25° C., Component (C) has a ratio of $(CH_3)_3SiO_{\frac{1}{2}}$ units to $SiO_2$ units of from about 0.6:1 to about 1:1, and Component (D) has a surface area of from about 100 $m^2/g$ to about 300 $m^2/g$.

4. A foam suppressant composition as recited in claim 2 wherein Component (A) is from about 85% to about 95%, by weight, based on the total weight of the composition, Component (B) is from about 3.8% to about 11.3%, by weight, based on the total weight of the composition, Component (C) is from about 0.5% to about 1.5%, by weight, based on the total weight of the composition, and Component (D) is from about 1.25% to about 2.25%, by weight, based on the total weight of the composition.

5. A foam suppressant composition as recited in claim 4 wherein Component (A) has a viscosity of from about $6.00 \times 10^{-2} m^2$/second to about $1.00 \times 10^{-3} m^2$/second at 25° C., Component (B) has a viscosity of about $1.00 \times 10^{-3} m^2$/second at 25° C., Component (C) has a ratio of $(CH_3)_3SiO_{\frac{1}{2}}$ units to $SiO_2$ units of from about 0.6:1 to about 1:1, and Component (D) has a surface area of from about 100 $m^2/g$ to about 300 $m^2/g$.

6. A foam suppressant composition as recited in claim 5 wherein Component (D) is precipitated silica.

7. A method for suppressing foam in an aqueous or hydrocarbon liquid, said method comprising adding to said liquid from about 0.5 ppm to about 200 ppm, by weight, based on the weight of said liquid, of a foam suppressant composition consisting essentially of
   (A) from about 75% to about 99%, by weight, based on the total weight of the composition, of α,ω-bis-(trimethylsiloxy) polydimethylsiloxane having a viscosity of from about $5.00 \times 10^{-3} m^2$/second to about $2.00 \times 10^{-1} m^2$/second at 25° C.,
   (B) from about 0.75% to about 18.75%, by weight, based on the total weight of the composition, of α,ω-bis-(trimethylsiloxy) polydimethylsiloxane having a viscosity of from about $1.00 \times 10^{-5} m^2$/second to about $1.50 \times 10^{-3} m^2$/second at 25° C.,
   (C) from about 0.02% to about 2.5%, by weight, based on the total weight of the composition, of a siloxane resin composed of $(CH_3)_3SiO_{\frac{1}{2}}$ units and $SiO_2$ units, wherein the ratio of $(CH_3)_3SiO_{\frac{1}{2}}$ units to $SiO_2$ units is from about 0.4:1 to about 1.2:1, and
   (D) from about 0.10% to about 3.75%, by weight, based on the total weight of the composition, of amorphous silica, said silica having a surface area of from about 50 $m^2/g$ to about 400 $m^2/g$ 8. A method as recited in claim 7, wherein the liquid is a hydrocarbon liquid, and wherein the foam suppressant composition is dispersed in an aliphatic hydrocarbon solvent prior to adding said foam suppressant composition to said liquid.

9. A method as recited in claim 8 wherein Component (A) is from about 80% to about 98%, by weight, based on the total weight of the composition, Component (B) is from about 1.5% to about 15%, by weight, based on the total weight of the composition, Component (C) is from about 0.2% to about 2%, by weight, based on the total weight of the composition, and Component (D) is from about 0.3% to about 3%, by weight, based on the total weight of the composition.

10. A method as recited in claim 9 wherein Component (A) has a viscosity of from about $6.00 \times 10^{-2} m^2$/second to about $1.00 \times 10^{-3} m^2$/second at 25° C., Component (B) has a viscosity of about $1.00 \times 10^{-3} m^2$/second at 25° C., Component (C) has a ratio of $(CH_3)_3SiO_{\frac{1}{2}}$ units to $SiO_2$ units of from about 0.6:1 to about 1:1, and Component (D) has a surface area of from about 100 $m^2/g$ to about 300 $m^2/g$.

11. A method as recited in claim 10 wherein Component (D) is precipitated silica.

12. A method as recited in claim 7, wherein the liquid is an aqueous liquid, and wherein the foam suppressant composition is emulsified in water prior to adding said foam suppressant composition to said liquid.

13. A method as recited in claim 12 wherein Component (A) is from about 80% to about 98%, by weight, based on the total weight of the composition, Component (B) is from about 1.5% to about 15%, by weight, based on the total weight of the composition, Component (C) is from about 0.2% to about 2%, by weight, based on the total weight of the composition, and Component (D) is from about 0.3% to about 3%, by weight, based on the total weight of the composition.

14. A method as recited in claim 13 wherein Component (A) has a viscosity of from about $6.00 \times 10^{-2}$ m$^2$/second to about $1.00 \times 10^{-3}$ m$^2$/second at 25° C., Component (B) has a viscosity of about $1.00 \times 10^{-3}$ m$^2$/second at 25° C., Component (C) has a ratio of $(CH_3)_3SiO_{\frac{1}{2}}$ units to $SiO_2$ units of from about 0.6:1 to about 1:1, and Component (D) has a surface area of from about 100 m$^2$/g to about 300 m$^2$/g.

* * * * *

UNITED STATES PATENT AND TRADEMARK OFFICE
CERTIFICATE OF CORRECTION

PATENT NO. : 4,486,336
DATED : December 4, 1984
INVENTOR(S) : Peter G. Pape, David N. Willing It is certified that error appears in the above-identified patent and that said Letters Patent is hereby corrected as shown below:

In Column 1, line 34, "3,445,839" should read --3,455,839--.
In Column 3, line 6, "of" should read --to--.
In Column 3, line 16, "units" should be inserted after "$SiO_2$".
In Column 6, line 54, "or" second occurrence should read --of--.
In Column 15, line 5, "$1.00 \times 10^2 m^2/s$," should read --$1.00 \times 10^{-2} m^2/s$,--.

*Signed and Sealed this*

*Twenty-first* Day of *May 1985*

[SEAL]

*Attest:*

DONALD J. QUIGG

*Attesting Officer*     *Acting Commissioner of Patents and Trademarks*